United States Patent
Hedley et al.

[19]

[11] Patent Number: 6,029,775
[45] Date of Patent: Feb. 29, 2000

[54] ACCESS DEVICE

[75] Inventors: Robert Ian Hedley, Milbrodale via Singleton; Christopher Nash Whybin, Banxton, both of Australia

[73] Assignee: Justoy Pty Ltd., Australia

[21] Appl. No.: 09/246,235

[22] Filed: Feb. 8, 1999

[30] Foreign Application Priority Data

Feb. 10, 1998 [AU] Australia .................................. 1751/98

[51] Int. Cl.⁷ ...................................................... E06C 5/22
[52] U.S. Cl. ............................ 182/127; 182/84; 280/166
[58] Field of Search .............................. 182/84, 127, 83, 182/85, 86, 97, 129; 280/166

[56] References Cited

U.S. PATENT DOCUMENTS

| 4,245,716 | 1/1981 | Rayfield | 182/86 |
| 5,813,494 | 9/1998 | Ulschmid | 182/127 |

FOREIGN PATENT DOCUMENTS

| 1135326 | 8/1962 | Germany | 182/84 |
| 1027 763 | 4/1966 | United Kingdom | 182/84 |

*Primary Examiner*—Alvin Chin-Shue
*Attorney, Agent, or Firm*—Cesari and McKenna LLP

[57] ABSTRACT

An access device for providing access between a substrate surface and the cabin of a vehicle. The device is attached to a rotating actuator extending outwardly from the side of the cabin for moving of the device between the access position (FIG. 1) and the storage position (FIG. 3). The device includes a substantially triangularly shaped platform. A first side of the platform is attached to the rotating actuator. A second side of the platform has the ladder depending therefrom. The third side of the platform is, in the access position (FIG. 1) located proximal to the cabin. The device is rotated by the rotating actuator to the storage position (FIG. 3) wherein the device is substantially upturned relative to the access position (FIG. 1) of the device and wherein a substantial part of the device is positioned above the rotating actuator.

6 Claims, 5 Drawing Sheets

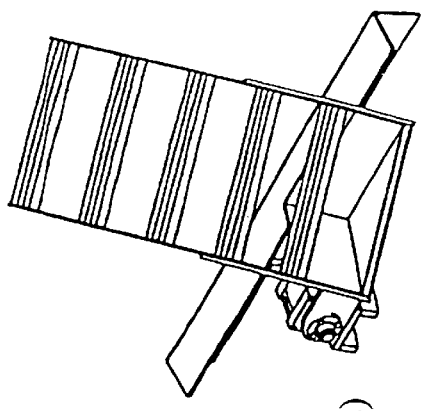
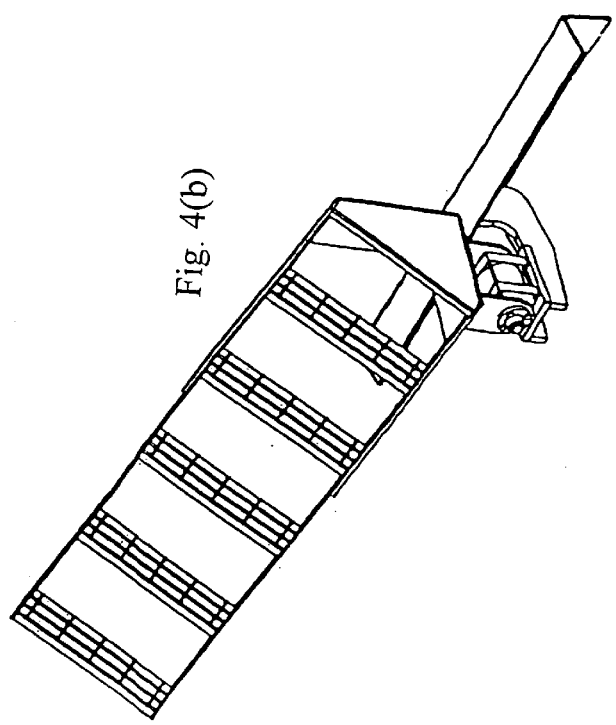
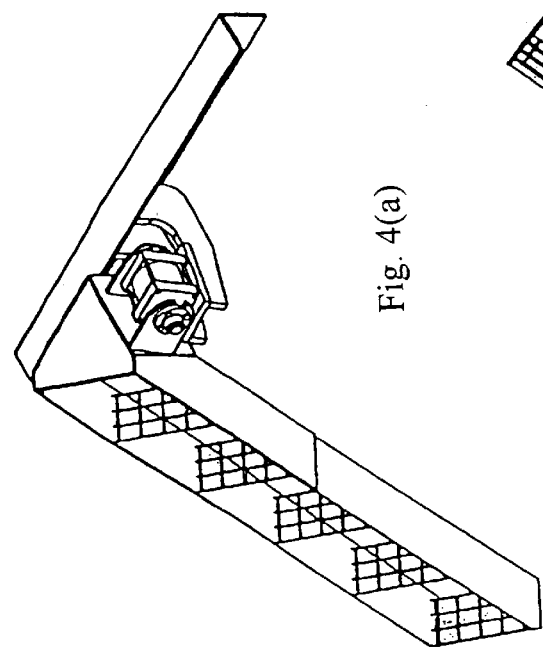
Fig. 4(a)
Fig. 4(b)
Fig. 4(c)

ACCESS DEVICE

FIELD OF THE INVENTION

The present invention relates to an access device, having a ladder or steps, which provides access between a lower and upper surface, such as a substrate surface and the elevated surface of a vehicle, for instance, earthmoving, mining, or like vehicles. The present invention in particular relates to an access device which is movable between an access position and a storage position, in which storage position the device is fully retracted, such that it would not interfere with the normal operation of a vehicle.

BACKGROUND OF THE RELATED ART

A variety of different access device configurations for removably or retractably providing an access member between operable and storage positions, are currently known. Some such devices are disclosed in the Applicant's Australian Patent No. 672706 and Australian Application No. 48282/97. Each of these devices described provides for access between a lower level and an upper level, whereby the device is pivotally moveable from a stable lower position to a stable upper position.

Some of these devices also provide handrails, for predetermined angles of inclination of the ladder in both the storage and access positions, such as may be required by various safety regulations, for ease of use, etc., while still providing a totally retractable device which is not likely to interfere with the normal operation of the vehicle.

SUMMARY OF THE INVENTION

The present invention seeks to provide an access device which may be used in alternative to the aforementioned devices, and which overcome certain disadvantages of prior art access devices.

The present invention seeks to provide an access device which is conveniently raised and lowered, taking up minimal space in a storage position, and which is provided to an operable position at a convenient angle, which would comply with relevant local safety standards.

In one broad form, the present invention provides an access device for providing access between a substrate surface and the cabin of a vehicle, said device attached to a rotating actuator extending substantially outwardly from below the side of said cabin for movement of said device between an access position and a storage position, characterised in that said device includes a substantially triangular shaped platform, a first side of which is attached to said rotating actuator, a second side of which has a ladder extending therefrom, and a third side of which, in the access position is located proximal to said cabin to provide access via said ladder between said cabin and said substrate surface, said device being rotatably moveable by said rotating actuator to said storage position in which said device is substantially upturned relative to that of said access position such that a substantial part of said device is positioned above said rotating actuator.

Preferably, said platform is substantially the shape of a right angled triangle, with the ladder extending from the hypotenuse side of said triangle.

Also preferably, in said access position, said platform is disposed substantially horizontally, and, in said storage position, said platform is disposed approximately 180° from said access position, upturned from said access position.

Preferably, in said access device, said ladder is disposed at between 60° and 75°, and most preferably at 62°, relative to said substrate surface and at approximately 45° relative to the side of said vehicle.

Preferably, said rotating actuator extends slightly upwards and outwards from below the side of said cabin.

Also preferably, in the storage position, said ladder extends slightly outwardly from vertical adjacent to said vehicle cabin.

BRIEF DESCRIPTION OF THE DRAWINGS

The present invention will become more fully understood from the following detailed description of the preferred but non-limiting embodiment thereof, described in connection with the accompanying drawings, in which:

FIGS. 4(a), 4(b) and 4(c) shows the access device alone (i.e. without the vehicle), in the access position, half way between the access position and the stowed position, and in the stowed position, respectively; and, FIG. 5 illustrates an alternative view of the access device on the vehicle, as per FIG. 3.

DETAILED DESCRIPTION OF THE PREFERRED EMBODIMENTS

Throughout the drawings like numerals will be used to identify similar features, except where expressly otherwise indicated.

Figure 1:
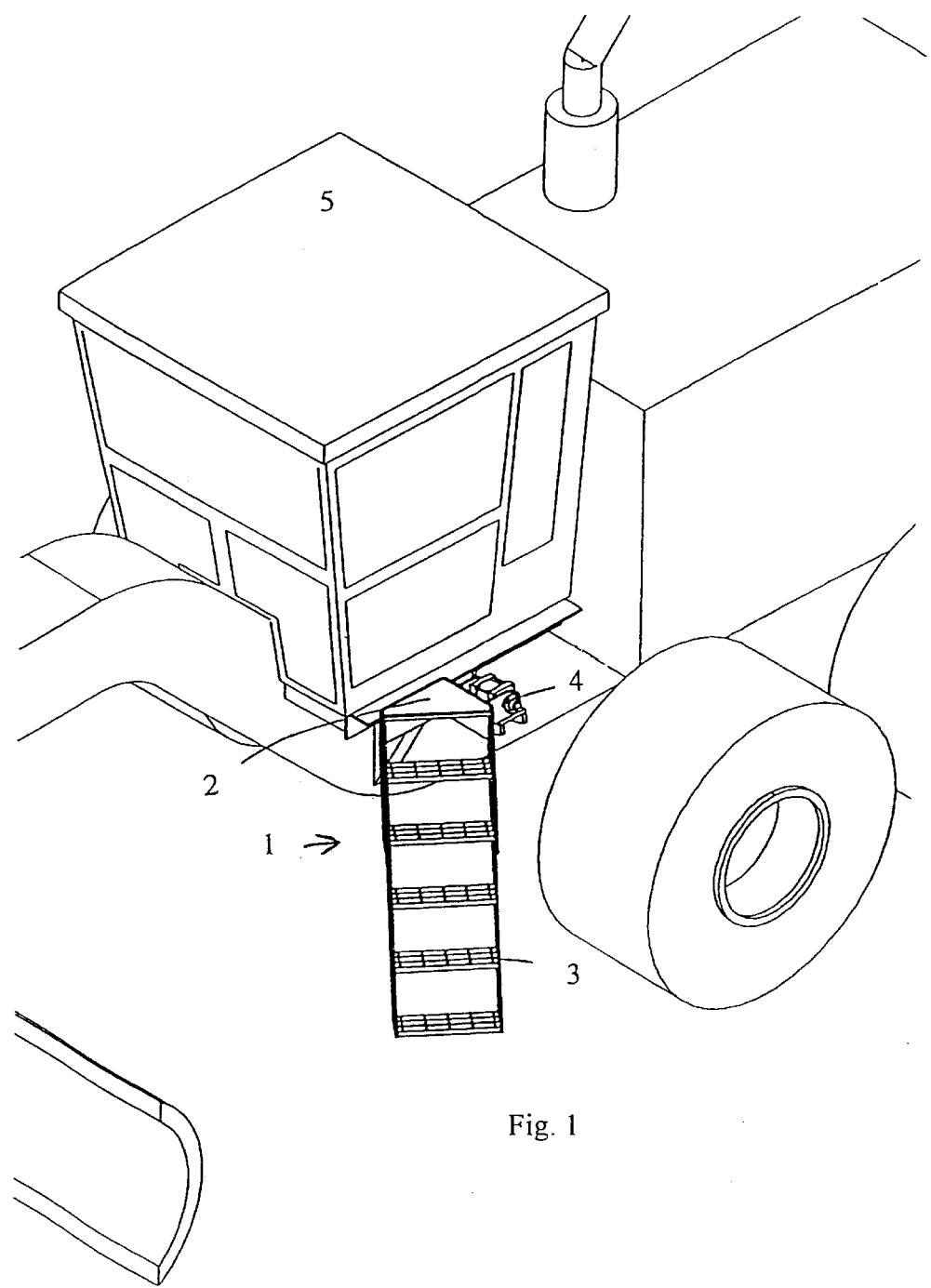
FIG. 1 illustrates the access device of the present invention, installed on a vehicle, in its access position.
Figure 2:
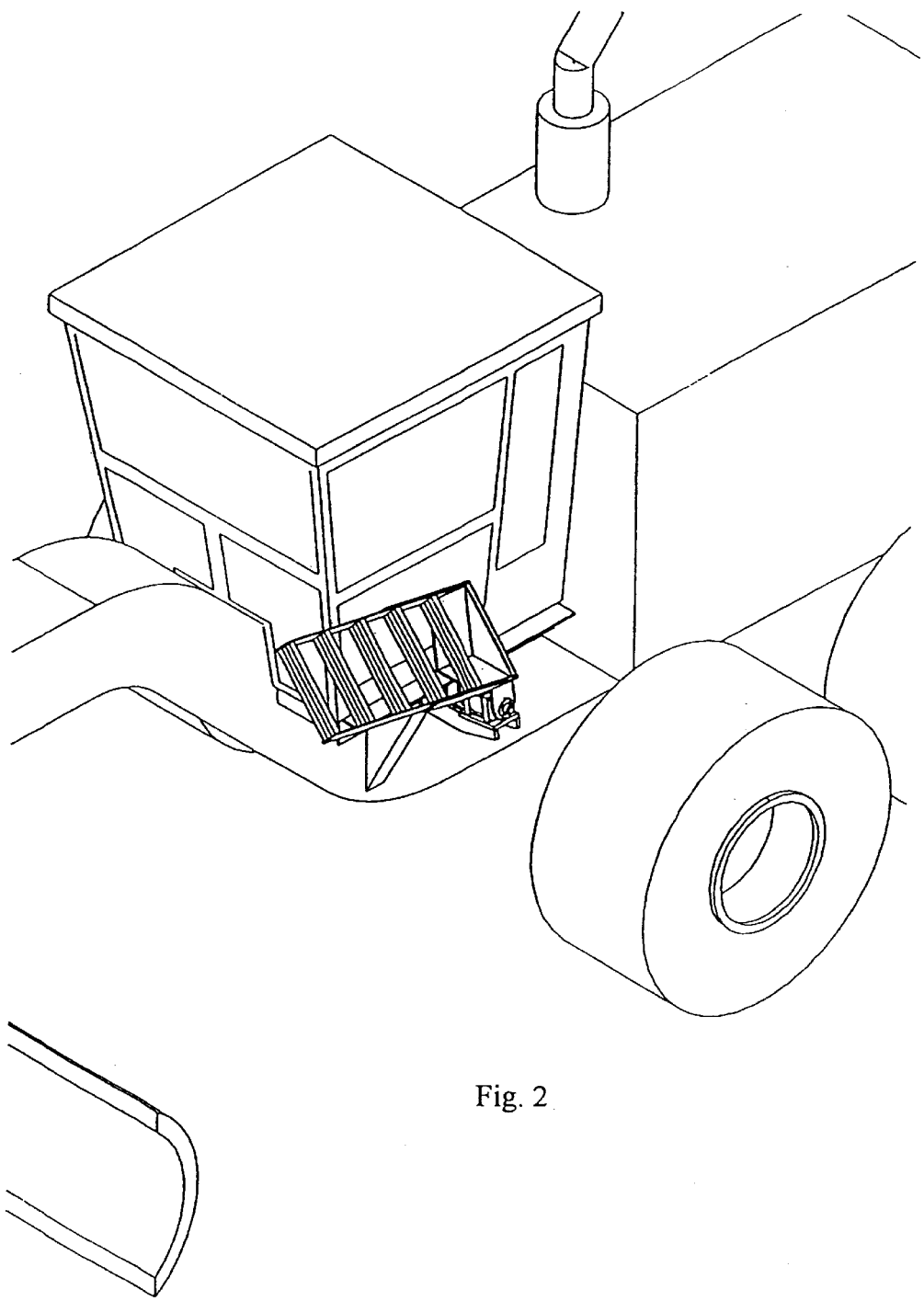
FIG. 2 shows the access device, installed on a vehicle, half way between its access position and its stowed position.
Figure 3:
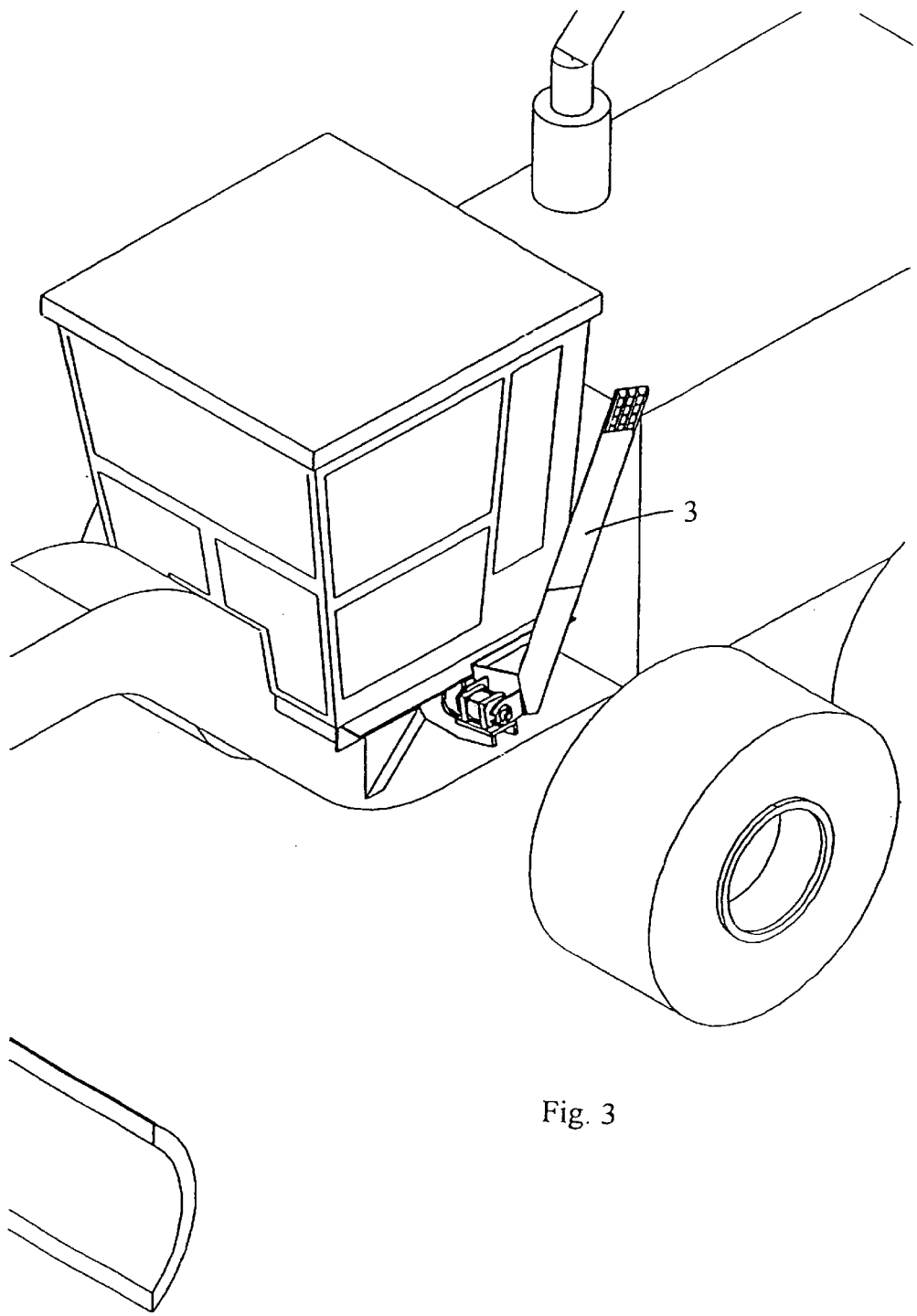
FIG. 3 shows the access device, installed on a vehicle, in its stowed position.

As illustrated in FIGS. 1, 2 and 3, the access device, in accordance with the present invention, may be adapted to a vehicle such as an earthmoving or mining vehicle. The present invention provides an access device, generally designated by the numeral 1, which includes a platform 2, a ladder 3, and a rotary actuator 4. As shown in FIGS. 1, 2 and 3, the access device may be moved between an access position as shown in FIG. 1, and a storage position shown in FIG. 3. FIG. 2 illustrates an intermediate position.

Referring initially to FIG. 1, it can be seen that the access device, in the access position, provides a ladder substantially downwardly disposed from a triangular shaped platform 2. The triangular shaped platform 2 is of right-angular triangle shape, with the ladder downwardly depending from the hypotenuse side. The ladder member is preferably inclined at an angle of between 60° and 75°, and perhaps most optimally at 62°, from the platform 2. This facilitates the easy ascending/descending of the ladder by a person to/from the platform 2, for entry into the cabin of a vehicle 5. In this position, it will be seen that one side of the triangular shaped platform is disposed proximal to the cabin of a vehicle 5, while the other side of the triangular shaped platform is connected to the rotary actuator 4.

Referring now to FIG. 3, which illustrates the storage position of the access device, it can be seen that the ladder 3 is substantially upwardly inclined, having been rotated approximately 180° relative to its access position of FIG. 1. That is, the platform 2 is positioned substantially coplanar to the platform position of FIG. 1, except that it is upsidedown. In the storage position, it will be clearly seen that the access device does not protrude from the vehicle perimeter, such that there can be no chance of interference during normal operation of the vehicle 5 during its earthmoving, mining, or other operations. In the storage position of FIG. 3, the platform neatly sits behind, but adjacent to, the entry point from the cabin of the vehicle 5.

Movement of the ladder 3, and platform member 2, is effected by operation of a rotary actuator 4 from any convenient location, such as from within the cabin of the vehicle 5, by a remote control device, or otherwise.

During operation of the rotary actuator, the platform 2 and the ladder are moved throughout an arc of approximately 180°. An intermediate position, during this process, is shown in FIG. 2.

Further details of the component features of the invention are shown in FIG. 4, without the actual vehicle to which the access device may be attached. Therefore, the representations shown in FIGS. 4(a), 4(b) and 4(c) substantially correspond to FIGS. 1, 2 and 3, respectively.

Figure 5:
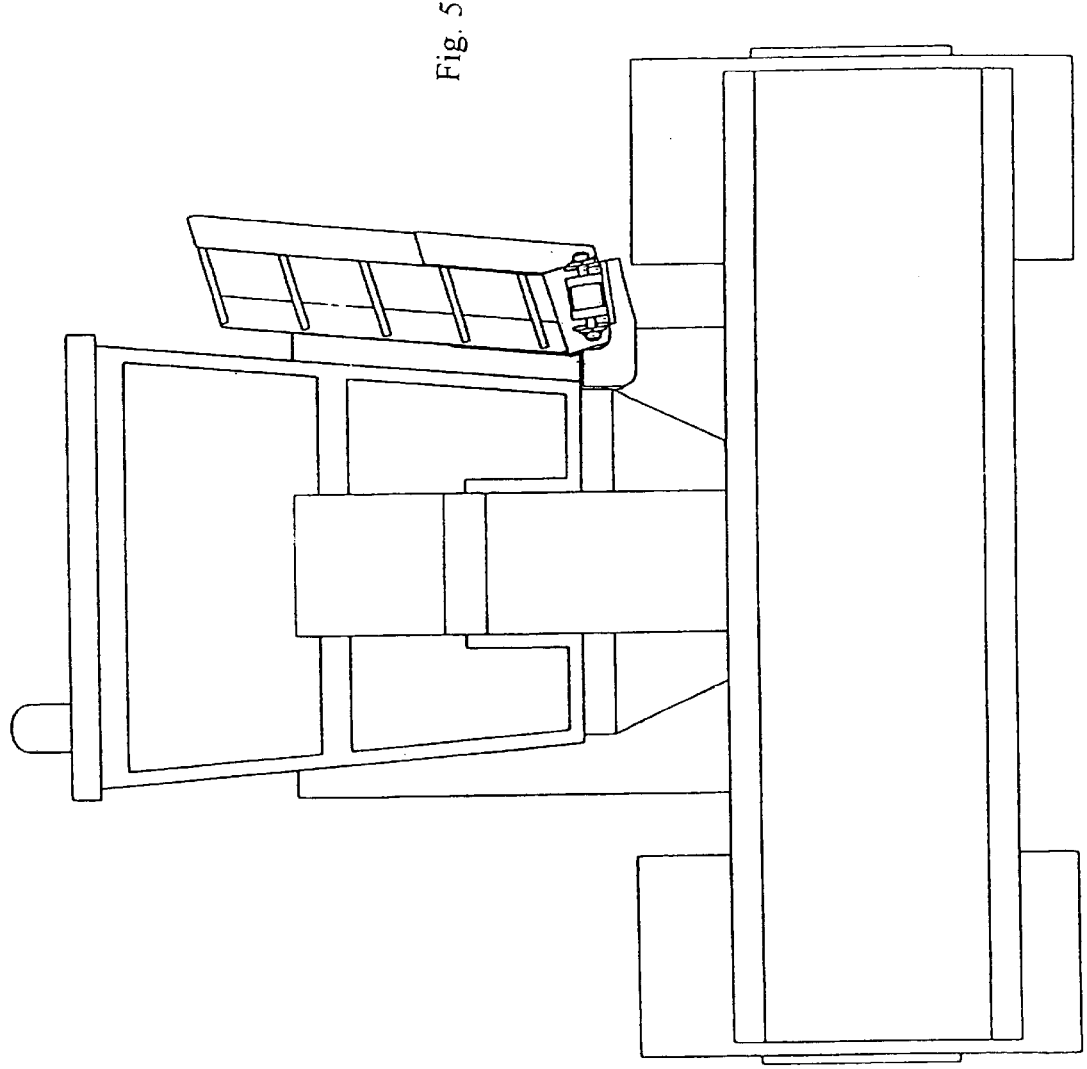

FIG. 5 illustrates a further view of the access device in the storage position as per FIG. 3. In FIG. 5, it can be seen that the rotary actuator extends substantially outwardly from below the side of the cabin, at a slightly upwardly inclined angle, such that, in a storage position, the ladder extends slightly outwardly from vertical, adjacent the vehicle cabin.

It will therefore be appreciated that the present invention provides an access device which is particularly useful for installation of the side of a vehicle such as an earthmoving or mining vehicle, where large clearance under a vehicle is required. Provision of such a ladder will allow for easy access of an operator to the vehicle, but also for complete retraction of the ladder out of the way of any earthmoving or mining operations.

It will be understood that there are other applications for the device other than on a vehicle.

While a particular embodiment of this access device has been hereinbefore described, it will be appreciated that numerous variations, alterations and additions to such an access device will be envisaged to persons skilled in the art. All such modifications should therefore be considered to fall within the scope of the invention as broadly hereinbefore described and as claimed hereinafter.

We claim:

1. An access device for providing access between a substrate surface and the elevated side entry of a vehicle, said device comprising an actuator having a rotary shaft which is rotatable about an axis between a first position and a second position;

a triangular platform having, first, second and third sides, the first side being attached to said shaft;

a ladder having a first end rigidly attached to said second side of the platform so that the ladder extends at a fixed angle to said second side, and means for mounting said actuator to a vehicle having an elevated side entry whereby when said shaft is rotated between said first and second positions, the platform and ladder are swung between an access position wherein the third side of the platform extends on one side of said axis toward the entry and the ladder extends downward from the actuator and a storage position wherein the third side of the platform extends away on the opposite of said axis away from the entry and the ladder extends upwards from the actuator.

2. An access device as claimed in claim 1, wherein said platform is substantially the shape of a right angled triangle, with the ladder extending from the hypotenuse side of said triangle.

3. An access device as claimed in claim 1 or 2, wherein in said access position, said platform is disposed substantially horizontally and in said storage position, said platform is disposed approximately 180° from said access position, upturned from said access position.

4. An access device as claimed in claim 1 or 2, wherein in said access position, said ladder is disposed at between 60° and 75°, and most preferably at 62° relative to said platform and at approximately 45° relative to said axis.

5. An access device as claimed in any one of claims 1 or 2 wherein when said actuator is mounted to said vehicle by said mounting means, said axis extends slightly upwards and outwards from the vehicle.

6. An access device as claimed in claim 5, wherein in the storage position, said ladder extends slightly outwardly from vertical adjacent to the entry.

* * * * *